United States Patent [19]
Steele et al.

[11] Patent Number: 5,664,213
[45] Date of Patent: Sep. 2, 1997

[54] INPUT/OUTPUT (I/O) HOLDOFF MECHANISM FOR USE IN A SYSTEM WHERE I/O DEVICE INPUTS ARE FED THROUGH A LATENCY INTRODUCING BUS

[75] Inventors: James C. Steele, Chandler; Gary D. Hicok, Mesa; David R. Evoy, Tempe; Gary A. Walker, Phoenix; Joseph A. Thomsen, Gilbert; Lonnie C. Goff, Tempe, all of Ariz.

[73] Assignee: VLSI Technology, Inc., San Jose, Calif.

[21] Appl. No.: 504,936

[22] Filed: Jul. 20, 1995

Related U.S. Application Data

[63] Continuation-in-part of Ser. No. 187,960, Jan. 28, 1994, Pat. No. 5,475,854.

[51] Int. Cl.[6] .................................................. G06F 13/00
[52] U.S. Cl. .......................... 395/837; 395/500; 395/835; 364/DIG. 1; 364/240.5; 364/240
[58] Field of Search ........................ 395/800, 750, 395/500, 292, 306, 280, 872, 835, 840, 821, 842

[56] References Cited

U.S. PATENT DOCUMENTS

| | | | |
|---|---|---|---|
| 4,358,825 | 11/1982 | Kyu et al. | 395/325 |
| 5,142,628 | 8/1992 | Okochi et al. | 395/325 |
| 5,305,441 | 4/1994 | Okochi et al. | 395/325 |
| 5,390,350 | 2/1995 | Chung et al. | 395/150 |
| 5,404,460 | 4/1995 | Thomsen et al. | 395/275 |
| 5,475,854 | 12/1995 | Thomsen et al. | 395/800 |

OTHER PUBLICATIONS

Specification for *Serialized IRQ/Data for PCI Systems*, Version 5.3, May 9, 1995.
Specification for *Serialized IRQ/Data for PCI Systems*, Version 4.0, Feb. 27, 1995.

*Primary Examiner*—Mehmet B. Geckil
*Attorney, Agent, or Firm*—Douglas L. Weller

[57] ABSTRACT

An I/O holdoff mechanism is used to compensate for I/O device inputs being fed through a latency introducing bus. A system includes one or more I/O devices connected through a serial bus to a controller device. Each I/O device includes at least one request pin which is connected to a peripheral device. A serializer in the I/O device responds to a voltage transition occurring on any request pin of the I/O device by forwarding, in a packet over the serial bus, an indicator. The indicator indicates a current voltage on the request pin of the I/O device on which the voltage transition occurred. The controller device includes a deserializer and a bus controller. The deserializer receives the first packet and outputs a signal which indicates a current value for the voltage on the indicated request pin. The deserializer includes a busy output which indicates when the deserializer is busy and when the deserializer is idle. The bus controller responds to a request from a host system for a current value on a first request pin of the I/O device by forwarding to the host system a current value for a voltage on the indicated request pin, as indicated by the deserializer, when the deserializer is not busy. When the deserializer is busy, the bus controller responds to the request from the host system for the current value on the first request pin of the I/O device by waiting for the deserializer to become idle. Upon the deserializer becoming idle, the bus controller forwards to the host system the current value for the voltage on the indicated request pin.

21 Claims, 7 Drawing Sheets

INPUT/OUTPUT (I/O) HOLDOFF MECHANISM FOR USE IN A SYSTEM WHERE I/O DEVICE INPUTS ARE FED THROUGH A LATENCY INTRODUCING BUS

CROSS REFERENCE TO RELATED APPLICATION

This application is a continuation-in-part of application Ser. No. 08/187,960, filed Jan. 28, 1994, now U.S. Pat. No. 5,475,854.

BACKGROUND

The present invention generally relates to electronic input/output (I/O) systems and methods, and, more specifically, relates to an I/O holdoff mechanism for use in a system where I/O device inputs are fed through a latency introducing bus.

The trend in electronic systems is towards miniaturization, as shown by the success in the marketplace of laptop and notebook computers, and hand-held video games. As the size of electronic systems shrinks, the pin count on their components becomes a significant limiting factor in further decreasing the size of the end product. Many systems are conserving pins by taking certain functions that used to occur in parallel format, and implementing these functions instead in a serial format. Electronic systems that have components that communicate via a serial bus are well-known in the prior art. In this manner a parallel data transfer that used to take eight data bits and a control bit for handshaking (nine bits total) can be implemented in serial format, which requires only two pins, one for serial data and another for the control bit. One specific example of reducing pin count by serializing functions previously accomplished in parallel is found in the VL82C480 chipset by VLSI Technology, Inc. To minimize the number of pins required to support a traditional Industry Standard Architecture (ISA) bus, the VL82C480 put the direct memory access (DMA) Request (DRQ) and Interrupt Request (IRQ) inputs that service the ISA bus into a parallel to serial converter, and used the resulting serial stream to determine the state of the DRQ and IRQ inputs. This serial stream had a dedicated bit for each DRQ and IRQ input, making for a large serial packet. In essence, the serial stream provides a series of snapshot of the state of all the pins in the system.

This method of serialization of DRQs and IRQs introduces latency to these signals due to the time required to serialize the data, the time required to shift out this large serial packet, and the time required to convert this serial data back to parallel format. For the case of a DMA Request, excessive latency could result in the DRQ input being asserted after the service of the DMA is no longer required, resulting in overflowing or underflowing the DMA data transfer. For the case of an Interrupt Request, excessive latency could cause the IRQ input to be asserted when an interrupt is no longer present, resulting in the CPU serving the Interrupt Request needlessly. For these reasons the latency of the serial stream is critical and must be minimized.

Even when latency is minimized, when many IRQ/DRQ signals transition at once, there will be a considerable amount of latency at the receiver before these transitions all arrive. For programs which depend on seeing real-time signal values at the I/O controller and DMA controller, the latency can cause significant errors in the system.

SUMMARY OF THE INVENTION

In accordance with the preferred embodiment of the present invention, a system is presented in which an I/O holdoff mechanism is used to compensate for I/O device inputs being fed through a latency introducing bus. The system includes one or more I/O devices connected through a serial bus to a controller device. Each I/O device includes at least one request pin which is connected to a peripheral device. The I/O device responds to a voltage transition occurring on any request pin of the I/O device by forwarding, in a packet over the serial bus, an indicator. The indicator indicates a current voltage value on the request pin of the I/O device on which the voltage transition occurred.

The controller device includes a deserializer and a bus controller. The deserializer receives the first packet and outputs a signal which indicates a current value for a voltage on the indicated request pin. The deserializer includes a busy output which indicates when the deserializer is busy and when the deserializer is idle. The bus controller responds to a request from a host system for the current value on a first request pin of the I/O device by forwarding to the host system a current value for a voltage on the indicated request pin, as indicated by the deserializer, when the deserializer is not busy. When the deserializer is busy, the bus controller responds to the request from the host system for the current value on the first request pin of the I/O device by waiting for the deserializer to become idle. Upon the deserializer becoming idle, the bus controller forwards to the host system the current value for the voltage on the indicated request pin.

In one embodiment of the present invention, the controller device includes wait state assertion logic. The wait state assertion logic prevents the bus controller from forwarding to the host system the current value for the voltage on the indicated request pin when the deserializer when the deserializer is busy. For example, this embodiment is used when an I/O bus connected between the controller device and the host system operates in accordance with the ISA bus standard.

In an alternate preferred embodiment of the present invention, the controller device includes a latency counter which is, for example, located inside the deserializer. When the deserializer is busy, the bus controller responds to the request from the host system for the current value on the first request pin of the I/O device, by starting the counter. The counter, when started, issues a finished signal when the counter has counted a sufficient mount of clock cycles to allow any voltage transition occurring on any request pin of the I/O device to result in a signal being generated by the deserializer. Once the counter is started, upon the counter issuing the finished signal or upon the deserializer becoming idle, whichever first occurs, the current value for the voltage on the indicated request pin is forwarded to the host system. For example, this embodiment is used when an I/O bus connected between the controller device and the host system operates in accordance with the Peripheral Component Interconnect (PCI) bus standard as described in the PCI 2.1 specification. In one preferred embodiment, the controller device operates in two modes. In a first mode, the deserializer periodically is in an idle state. In a second mode, the deserializer never enters the idle state. When the controller device is operating in the second mode, the bus controller forwards the current value for the voltage on the indicated request pin to the host system upon the counter issuing the finished signal.

The present invention is useful in systems in which an I/O device interrupts or other information are passed to a controlling device by a serial bus/link. The present invention prevents system errors which could arise from latency of packet transfers affecting programs which depend on seeing real-time signal values at an I/O controller and/or a DMA controller.

DESCRIPTION OF THE PREFERRED EMBODIMENT

Figure 1:
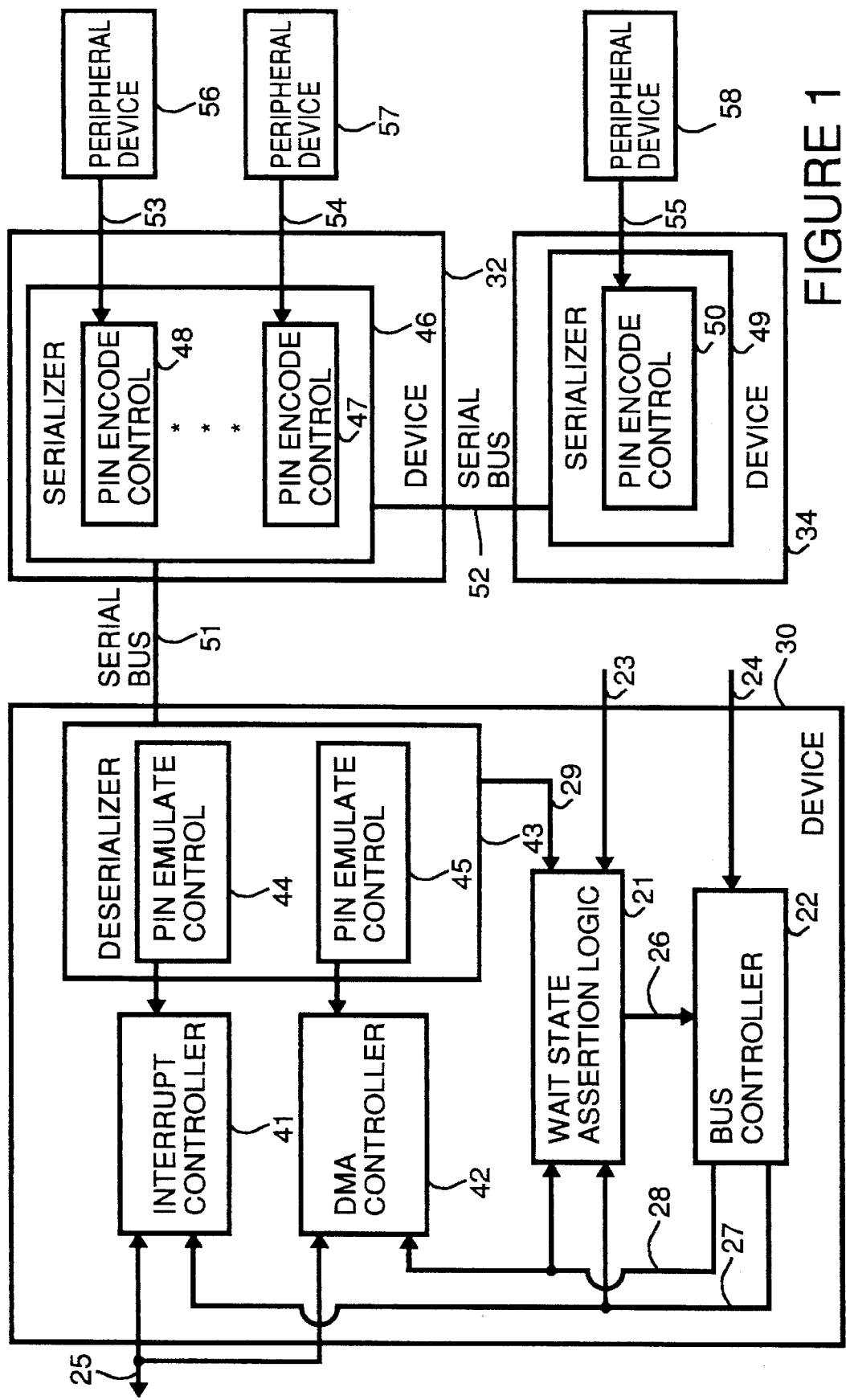
FIG. 1 shows a simplified block diagram of a system in which the rising and falling edges of signals on request pins are detected and serialized in accordance with a preferred embodiment of the present invention.

FIG. 1 shows a simplified block diagram of a system in which the rising and falling edges of interrupt signals are detected and serialized in accordance with a preferred embodiment of the present invention. In FIG. 1, a device 34 is connected through a serial bus connection 52 to a device 32. Device 32 is likewise connected to a device 30 through a serial bus connection 51. The signal placed on a request pin 55 by a peripheral device 58 is encoded by a pin encode control 50 within a serializer 49. For example, the signal on request pin 55 is an interrupt request or a DMA request. For each transition of the signal on request pin 55, serializer 49 sends a packet with the edge infomarion through serial bus connection 52 to device 32. Device 32 sends the packet through 51 on to device 30. Device 34 may have other request pins, the signals on which are encoded by additional pin encode controls.

The signal placed on a request pin 54 by a peripheral device 57 is encoded by a pin encode control 47 within a serializer 46. For example, the signal on request pin 54 is an interrupt request or a DMA request. For each transition of the signal on request pin 54, serializer 46 sends a packet with the edge information through serial bus connection 51 to device 30. The signal placed on a request pin 53 by a peripheral device 58 is encoded by a pin encode control 48 within serializer 46. For example, the signal on request pin 53 is an interrupt request or a DMA request. For each transition of the signal on request pin 53, serializer 46 sends a packet with the edge information through serial bus connection 51 to device 30. Device 34 may have other request pins, the signals on which are encoded by additional pin encode controls.

Device 30 includes various controllers. For example, FIG. 1 shows device 30 to include an interrupt controller 41 and a DMA controller 42. Deserializer 43 deserializes packet information received by device 30 over serial bus connection 51. For example, packets indicating a transition of an interrupt request signal are received by pin emulate control 44. Pin emulate control 44 produces an emulated interrupt request signal and forwards the emulated interrupt request signal to interrupt controller 41. Edge transitions of the emulated interrupt request signal are based on the packets device 30 receives over serial bus connection 51.

Packets indicating a transition of a DMA request signal are received by pin emulate control 45. Pin emulate control 45 produces an emulated DMA request signal and forwards the emulated interrupt request signal to DMA controller 42. Edge transitions of the emulated DMA request signal are based on the packets device 30 receives over serial bus connection 51.

A bus controller 22 is used by a host system to control a read of the IRQ signals received by interrupt controller 41 and DRQ signals received by DMA controller 42 onto bus data lines 25 of an I/O bus. For example, in the preferred embodiment, the data bus operates in accordance with the ISA bus standard and bus controller 22 is an ISA sequencer. Alternately, other types of data buses may be utilized. For example, the data bus may operate in accordance with the Peripheral Component Interconnect (PCI) bus standard as described in the PCI 2.1 specification.

Bus controller 22 controls a read from interrupt controller 41 using I/O read lines 27. Bus controller 22 controls a read from DMA controller 42 using I/O read lines 28.

Bus controller 22 is directed by the host system to perform reads to interrupt controller 41 and DMA controller 42 by control information placed on control lines 24 of the I/O bus. When directed by the control information placed on control lines 24, bus controller 22 will initiate a read from interrupt controller 41 by asserting a chip select for interrupt controller 41 and asserting an I/O read line. Using two address lines, bus controller 22 will indicate to interrupt controller 41 which register is to be read. Bus controller 22 will not complete the I/O read until it receives an I/O channel ready signal on line 23 of the I/O bus.

In the preferred embodiment of the present invention, the I/O channel ready signal on line 23 of the I/O bus is intercepted by wait state assertion logic 21. After the I/O channel ready signal on line 23 of the I/O bus is asserted, wait state assertion logic 21 will keep the I/O channel ready signal on a line 26 de-asserted to bus controller 22 as long as a busy signal on line 29 from deserializer 43 is asserted. Deserializer 43 asserts the busy signal on line 29 as long as deserializer 43 is receiving packets from serial bus 51. When serial bus 51 goes idle, deserializer 43 de-asserts the busy signal on line 29. Once the busy signal on line 29 is de-asserted, wait state assertion logic 21 asserts the I/O channel ready signal to bus controller 22 on a line 26. Bus controller 22 then completes the data transaction over the I/O bus.

Likewise, when directed by control information placed on control lines 24, bus controller 22 will initiate a read from DMA controller 42 by asserting a chip select for DMA controller 42 and asserting an I/O read line. Using two address lines, bus controller 22 will indicate to DMA controller 42 which register is to be read. Bus controller 22 will not complete the I/O read until it receives the I/O channel ready signal on line 23 of the I/O bus. The I/O channel ready signal on line 23 of the I/O bus is intercepted by wait state assertion logic 21. Once the I/O channel ready signal on line 23 of the I/O bus is asserted, wait state assertion logic 21 will keep the I/O channel ready signal on line 26 de-asserted to bus controller 22 as long as a busy signal on line 29 from deserializer 43 is asserted. Deserializer 43 asserts the busy signal on line 29 as long deserializer 43 is receiving packets from serial bus 51. When serial bus 51 goes idle, deserializer 43 de-asserts the busy signal on line 29. Once the busy signal on line 29 is de-asserted, wait state assertion logic 21 will assert the I/O channel ready signal to bus controller 22 on line 26. Bus controller 22 then completes the data transaction over the I/O bus.

Wait state assertion logic 21 is utilized to compensate for any latency in transfer of IRQ/DRQ pin values through serial bus 51 to deserializer 43. This latency is caused, for example, by the simultaneous transition of several IRQ signals or DRQ signals. The latency could result in system failure in the case where a program running on the host system is utilizing real-time values of IRQ signals and/or DRQ signals. For example, if the host system requires a real-time value and because of latency the host system accesses the information before the latest value arrives via the serial bus, the host system will have accessed a stale value.

It is noted that the only way real-time IRQ/DRQ signals can be obtained by the host system from interrupt controller 41 or DMA controller 42 is to perform a read by the host system from interrupt controller 41 or DMA controller 42 utilizing bus controller 22. By holding up any read of IRQ values or DRQ values over the I/O bus until serial bus 51 goes idle, the real-time the IRQ values and DRQ values are obtained by the read over the I/O bus.

Figure 7:
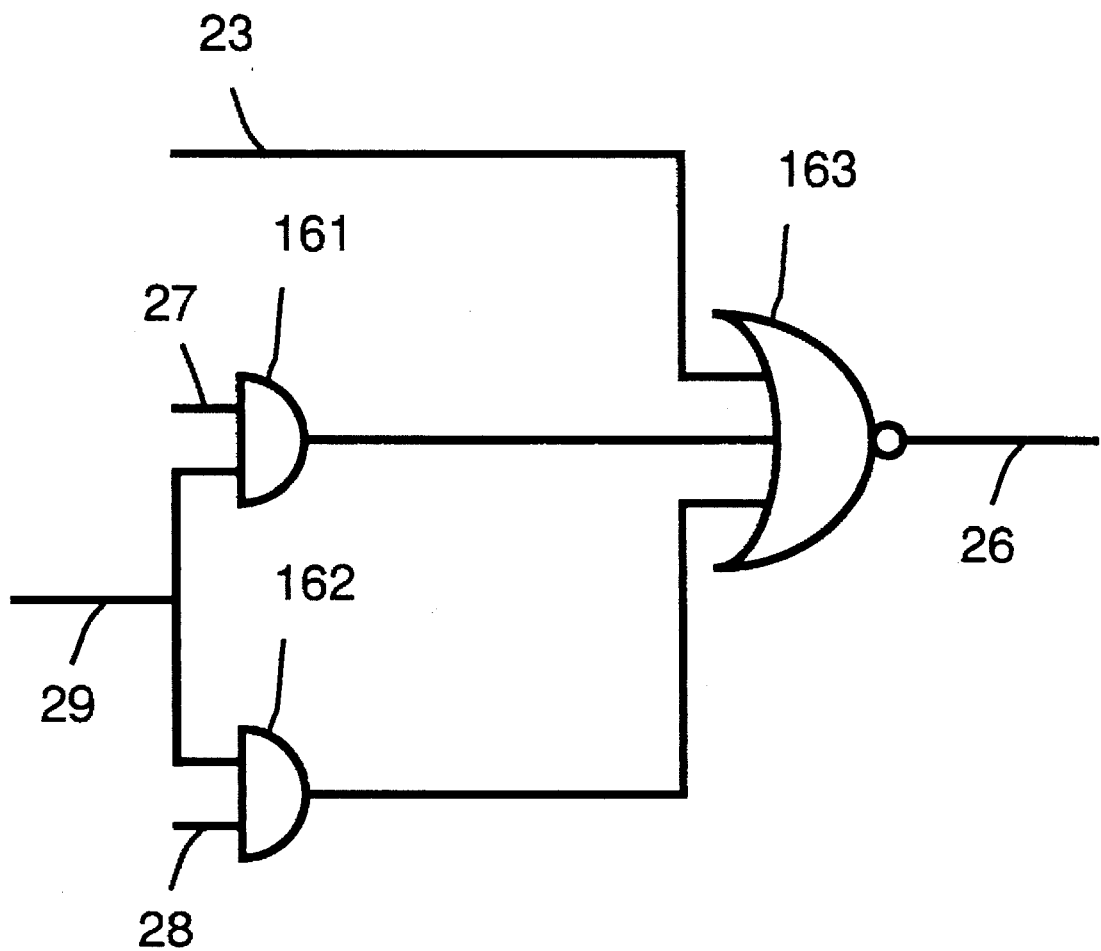
FIG. 7 shows a logic diagram for wait state assertion logic in accordance with a preferred embodiment of the present invention.

FIG. 7 shows logic which implements wait state assertion logic 21. The logic includes, for example, a logic AND gate 161, a logic AND gate 162 and a logic NOR gate 163 connected as shown.

Figure 2:
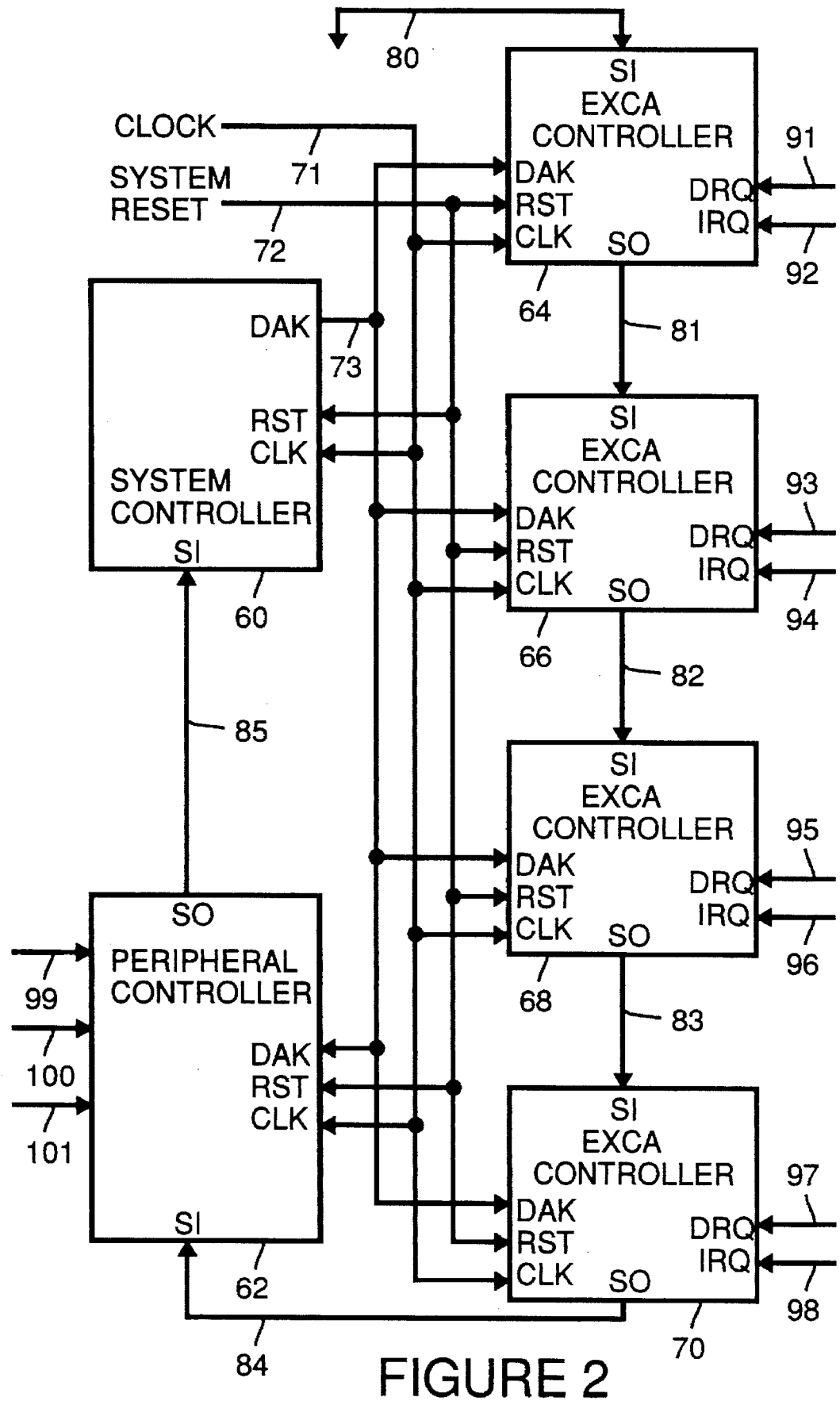
FIG. 2 shows a block diagram of a personal computer I/O system in which the rising and falling edges of interrupt and DMA request signals are detected and serialized, in accordance with a preferred embodiment of the present invention.

FIG. 2 provides an example of a specific system which utilizes the present invention. In FIG. 2, a system controller 60, a peripheral controller 62, and four identical I/O devices 64, 66, 68 and 70 known as EXCA controllers are shown. Each of devices 60, 62, 64, 66, 68, and 70 has a clock input (CLK) which is connected to a common clock source 71. Each of devices 62, 64, 66, 68, and 70 has at least one dedicated acknowledgment signal (DAK) line connected to system controller 60. These DAK lines are collectively labeled as lines 73 on FIG. 2. System controller 60 makes an acknowledgment to a particular device by asserting an acknowledgment signal (DAK) on the DAK line from DAK lines 73 which is connected to the particular device.

In addition, each of devices 60, 62, 64, 66, 68, and 70 has a reset input (RST) which is connected to a common system reset signal 72. The configuration shown in FIG. 2 is used in an IBM-compatible notebook computer system. System controller 60 corresponds to a CPU chipset, which includes an internal interrupt controller (not shown) and an internal DMA controller (not shown). EXCA controllers 64, 66, 68 and 70 are expansion slots for peripherals such as random access memory (RAM), a modem, serial and parallel communication ports, etc.

Each peripheral connected to one of EXCA controllers 64, 66, 68 and 70 can signal the EXCA controller using programmable interrupt requests (IRQ) and DMA requests (DRQ). EXCA controller 64 receives DMA requests from a first peripheral on a DRQ pin 91 and receives IRQ interrupt requests from the first peripheral on an IRQ pin 92. EXCA controller 66 receives DMA requests from a second peripheral on a DRQ pin 93 and receives IRQ interrupt requests from the second peripheral on an IRQ pin 94. EXCA controller 68 receives DMA requests from a third peripheral on a DRQ pin 95 and receives IRQ interrupt requests from the third peripheral on an IRQ pin 96. EXCA controller 70 receives DMA requests from a fourth peripheral on a DRQ pin 97 and receives IRQ interrupt requests from the fourth peripheral on an IRQ pin 98.

Peripheral controller 62 is used to encode interrupt request (IRQ) information on IRQ pins 100 and DMA request (DRQ) information on DRQ pins 101 relating to an ISA bus 101, and to pass along serial data from EXCA controllers 64, 66, 68 and 70 to system controller 60.

The serial in port (SI) to EXCA controller 64 is connected to a ground 80, and thus held to a constant low logic state. The serial out port (SO) of EXCA controller 64 is connected through a serial bus connection 81 to the serial in port of EXCA controller 66. Likewise, the serial out port of EXCA controller 66 is connected through a serial bus connection 82 to the serial in port of EXCA controller 68, and the serial out port of EXCA controller 68 is connected through a serial bus connection 83 to the serial in port of EXCA controller 70. The serial out port of EXCA controller 70 is connected through a serial bus connection 84 to the serial in port of peripheral controller 62, and the serial out port of peripheral controller 62 is connected through a serial bus connection 85 to the serial in port of system controller 60. These serial bus connections 81 through 85 provide daisy-chain connections from one device to the next and together form a serial bus.

The serial bus interconnects the devices of FIG. 2 as shown, providing a data path for EXCA controllers 64, 66, 68 and 70, and peripheral controller 62, to communicate with system controller 60. In a typical notebook computer application, this serial bus provides a low pin count solution for providing programmable interrupt requests (IRQ) and DMA requests (DRQ) for the peripherals coupled to EXCA controllers 64, 66, 68 and 70. The serial bus also allows the interrupts and DMA requests from other ISA bus peripherals to be located remotely from the DMA controller and interrupt controller within system controller 60, by coupling the IRQ and DRQ lines from the ISA Bus to peripheral controller 62 as shown. The serial bus encodes system management interrupt (SMI), IRQ, and DRQ information in a six bit packet and transmits this information serially to peripheral controller 62. The serial bus protocol provides for daisy chaining multiple interrupt request and DMA request sources together on a single serial stream, further minimizing the pin overhead for IRQ and DRQ support. This scheme allows multiple I/O devices to use the same IRQ level or DRQ level without these sources directly driving the same IRQ or DRQ signals. The serial bus uses defined packets to transfer data. Each packet contains six bits of information that is equivalent to one signal in a typical ISA bus implementation. The packet can be either an interrupt request (IRQ), a DMA request (DRQ), an SMI request, or an EXCA controller number, as shown in Table 1 below.

TABLE 1

| Bit # | Bit Name | Description | |
|---|---|---|---|
| 0 | Start Bit | Serial Data Output is driven low to signify the beginning of packet transmission | |
| 2–1 | Packet Type | 00: First Packet after Reset: EXCA controller ID packet | |
| | | 00: After ID packet: INT Negative Edge packet | |
| | | 01: SMI Request Packet | |
| | | 10: INT Positive Edge or Pulse Request Packet | |
| | | 11: DMA Request Packet | |
| 6–3 | Packet ID | Packet Type | Packet ID |
| | | [2:1] | [6:3] |
| | | 00 (first) | First Packet after reset=EXCA ID # (0–15) |
| | | 00 (not | After EXCA ID packet = |

TABLE 1-continued

| Bit # | Bit Name | Description | |
|---|---|---|---|
| | | first) | Negative Edge IRQ#(0–15) |
| | | 01 | SMI Request Number (0–15) |
| | | 10 | Positive Edge/Pulse IRQ#(0–15) |
| | | 11 | bits [5:3]=DRQ#(0–7) bit[6]=Positive Edge(0)/Negative Edge(1) |
| 7 | Stop Bit (optional) | If no more packets are queued to be transmitted, the serial out port will be driven to a logic 1. Otherwise, this bit will be replaced by the start bit of the next packet. | |

The first bit is a start bit. The next two bits are a packet type field which identifies the type of data being sent. The four remaining bits are packet identification (ID), identifying the packet. Note that an optional stop bit is also included if the serial data bus is idle following the packet. The serial bus is a synchronous serial bus, with all packets transmitted synchronously to the clock from common clock source 71. Data changes on the rising edge of the clock from common clock source 71. Each device 62, 64, 66, 68 and 70 on the serial bus samples data presented to its serial in port on the falling edge of the clock from common clock source 71, and resynchronizes the incoming data stream before passing it on. This introduces one clock cycle of latency for each I/O device on the serial bus, but guarantees that the data stream will always be synchronous to the clock from common clock source 71, regardless of the number of devices on the serial bus.

Common clock source 71 can be provided from an external source as shown in FIG. 2, or may be generated in one of the serial bus devices and connected to the remaining devices. The clock from common clock source 71 is typically a 25 MHz square wave in this particular example, but there is no minimum clock frequency requirement. The clock from common clock source 71 can be any frequency providing the latency on the serial bus is not so great that reliable system operation is impaired.

For the DMA requests (DRQ), a packet with a Packet type 11 is used to indicate the edge information for the DMA requests or the interrupt requests. The first three bits [5:3] of the packet ID are used to indicate the DMA level. This is possible because in the preferred embodiment there are only eight DMA request levels which may be identified using bits [5:3]. The sixth bit of the Packet ID contains the edge information. A positive edge is indicated by a 0 and a negative edge is indicated by a 1.

For the interrupt requests (IRQ), all of bits [6:3] of the Packet ID are used to identify the interrupt level, therefore, a packet with a packet type 00 is used to indicate a negative edge in the interrupt request. A packet with a Packet type 10 is used to indicate a positive edge or a pulse in the interrupt request. A pulse is indicated when a second packet with packet type 10 is received without an intervening negative edge IRQ packet (Packet Type 00) being received.

The arbitration algorithm is as follows. The position of an I/O device in the daisy chain determines the priority of the I/O device. The higher an I/O device is on the daisy chain (i.e., the farther away from system controller 60), the higher the priority.

Start bits for each I/O device are always a modulo 7 number of clock cycles apart. This allows each device on the serial bus to determine when it is allowed to start transmission of a packet. Since the higher priority devices are placed higher in the chain, they will keep the serial bus busy when they require service, effectively locking out lower priority devices which are lower down the chain until the serial bus goes inactive. Since a stop bit only occurs if there is no packet immediately following the current packet, a stop bit signals the I/O device receiving it that the serial bus is available for it to transmit a packet, if needed. Given the one clock cycle latency for each I/O device caused by resynchronizing incoming data to the clock from common clock source 71, an I/O device can sense a stop bit, and begin transmitting its packet on the very next clock cycle.

To assure that the I/O devices remain synchronized to the clock from common clock source 71, each I/O device counts the number of successive ones received on its serial in port. When the count of ones exceeds six, the I/O device knows than an empty packet has just occurred, and the I/O device will synchronize itself to the next zero bit since it is, by definition, a start bit.

The serial bus can be used to transfer information regarding interrupt requests (including IRQ and SMI requests) and DMA requests from each EXCA controller, as well as configuring the EXCA controllers 64, 66, 68 and 70 to their respective assigned address spaces. The present invention relates to the serialization of IRQ, SMI and DRQ signals.

Figure 4:
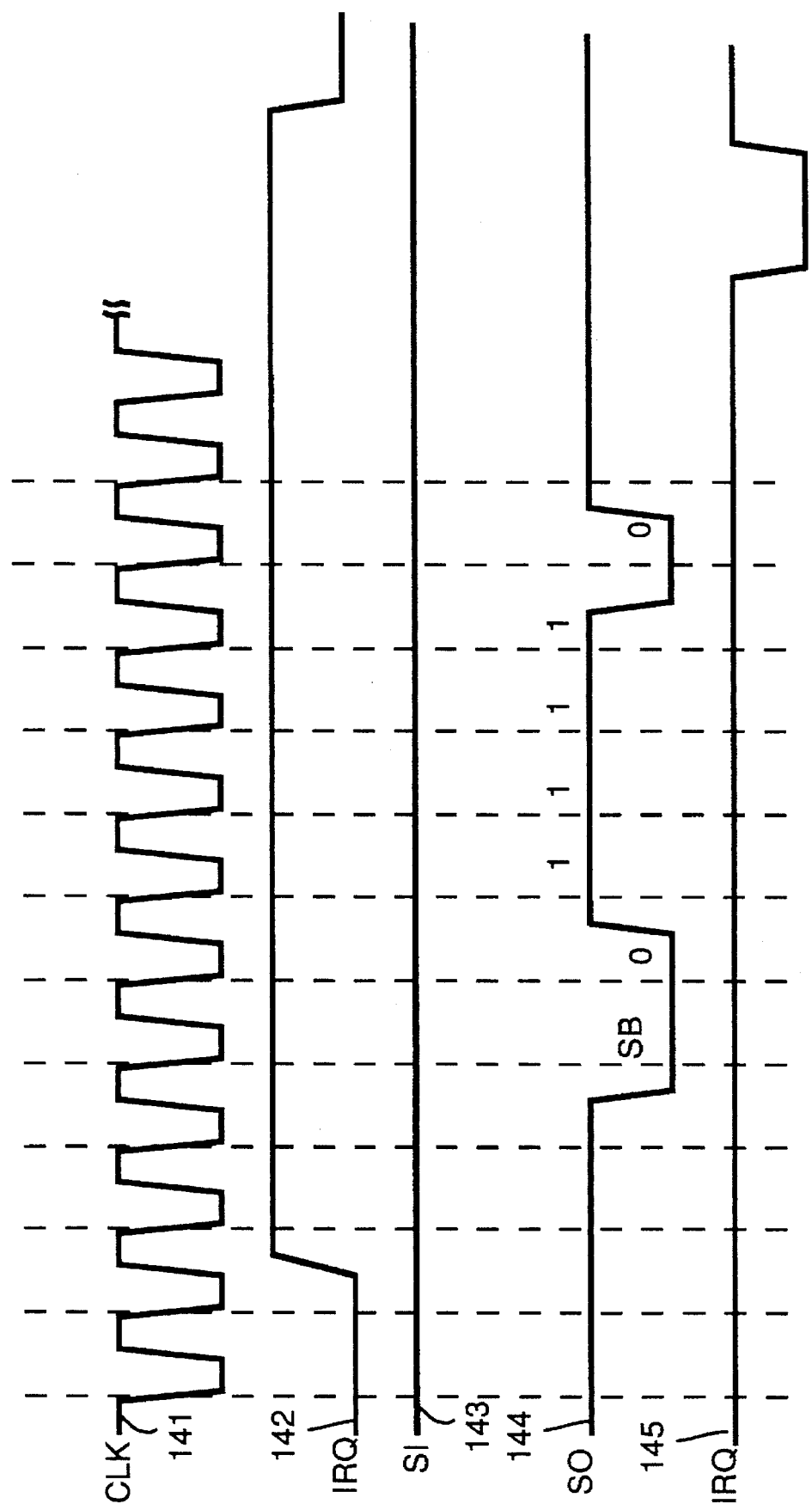
FIG. 4 is a timing diagram showing the timing sequence for serializing an interrupt request for the system of FIG. 2.
Figure 5:
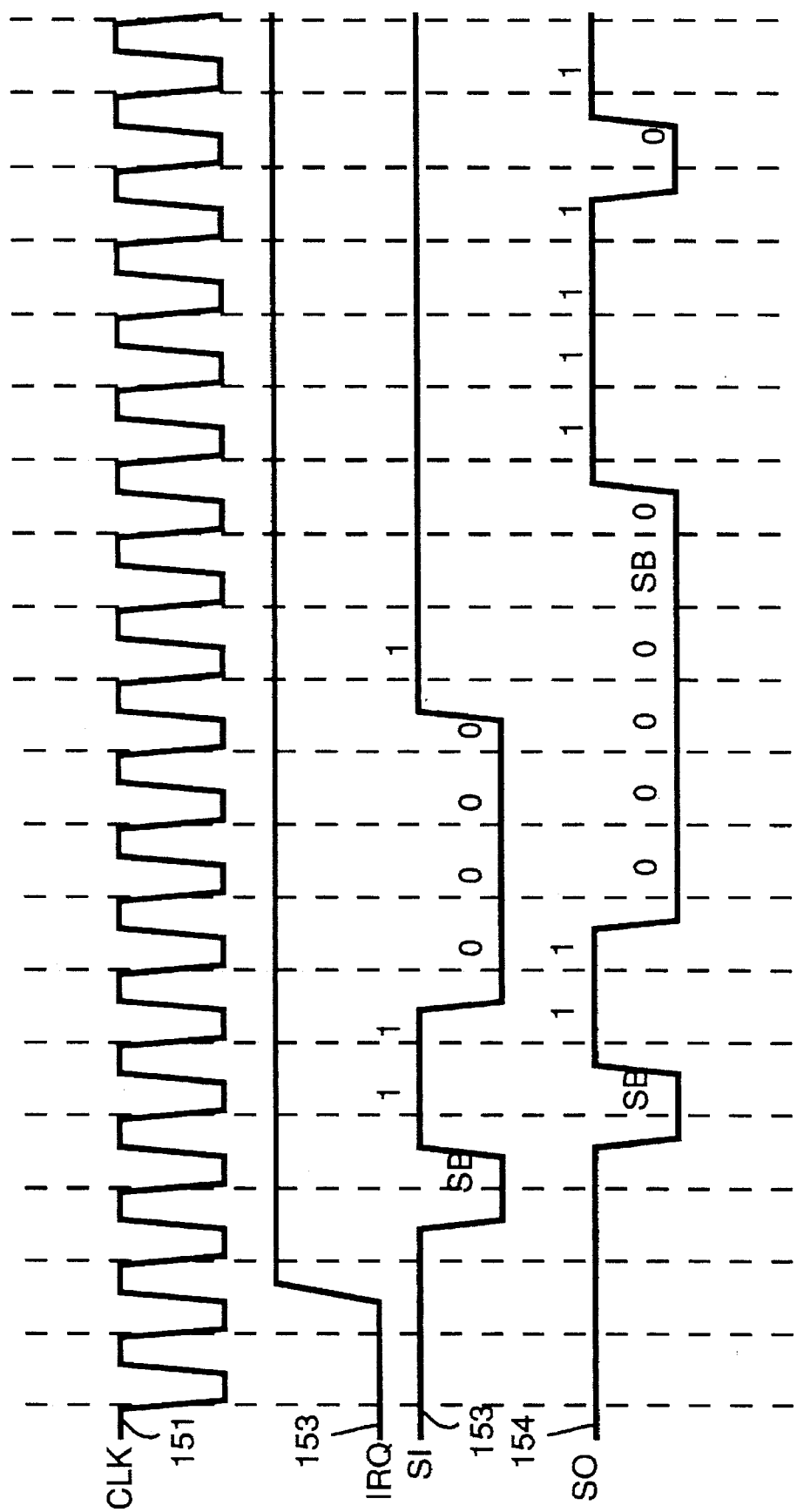
FIG. 5 is a timing diagram showing the timing sequence for serializing an interrupt request for the system of FIG. 2 when the serial bus is busy with a DMA request.

An EXCA controller transmits Packet Type 01 when it requires SMI service from system controller 60, transmits Packet Type 60 when it requires Interrupt Request service from system controller 60, and transmits a Packet Type 11 when it requires service from the DMA controller within system controller 60. Packet type 00, is used to configure the EXCA controllers 64, 66, 68 and 70 upon system reset or power-up. After start-up, the Packet type 00 is used to indicate an IRQ negative edge. The operation of the system as shown in FIGS. 3 through 5 assumes that the system has been reset, and that the EXCA controllers 64, 66, 68 and 70 have all been configured to their unique address spaces.

Figure 3:
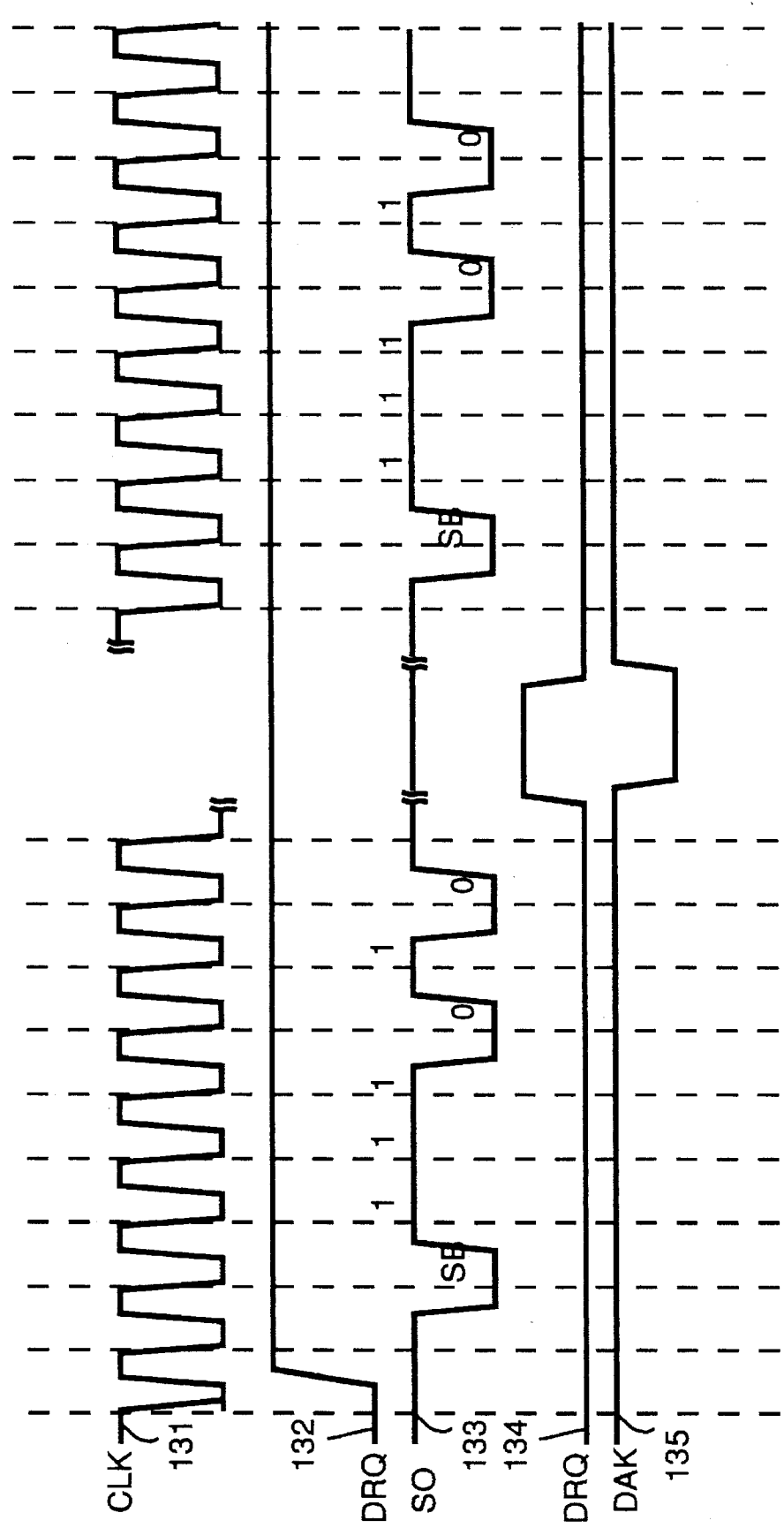
FIG. 3 is a timing diagram showing the timing sequence for serializing a DMA request for the system of FIG. 2.

The timing of the serialization of a typical DMA Request for the system of FIG. 2 is shown in FIG. 3. This particular example assures that the first peripheral, which is connected to EXCA controller 64 (see FIG. 2), desires to assert a level five DRQ signal within the system controller when the first peripheral asserts the DRQ input pin 91 of EXCA controller 64. The DRQ signal on input pin 91 is represented by waveform 132 in FIG. 3. The level five DRQ signal within the system controller is represented by waveform 134 in FIG. 3. Common clock source 71 is represented by waveform 131.

When the first peripheral asserts the DRQ signal to EXCA controller 64, EXCA controller 64 outputs a serial packet on its serial out port that has a Packet Type of 11 (indicating a DMA Request Packet) and a Packet ID of 0601 (indicating that level five DRQ requires service). The signal on the serial out port of EXCA controller 64 is represented by waveform 133. After this packet travels through EXCA controllers 66, 68 and 70, and through peripheral controller 62, it reaches system controller 60, which decodes the packet and asserts the level five DRQ signal to its internal DMA controller.

The DMA controller within system controller 60 acknowledges the assertion of the DRQ signal within the system controller by asserting a level five DAK signal. The level 5 DAK is represented by waveform 135. The DAK input to each EXCA controller 64, 66, 68 and 70 are internally ANDed with the DRQ input for each EXCA controller, and the EXCA controller 64 will thus generate a DMA Request Packet each time it sees a low to high transition on the output of this AND gate. In this manner, if level five DAK is high as shown in FIG. 3 when the first peripheral asserts the DRQ signal on DRQ pin 91, the output of the internal AND gate within EXCA controller 64 goes from low to high, and EXCA controller 64 therefore generates a D1VIA Request Packet. This scheme results in a DMA Request Packet being generated when DRQ goes active when DAK is already high, or when DAK goes inactive with DRQ still active. This causes demand mode DMA devices to essentially issue multiple DMA requests instead of issuing one long, continuous request. System controller 60 asserts the appropriate DRQ lines to its internal DMA controller whenever a DMA Request Packet is received, and negates it when the appropriate DAK level is generated. Since the four bits of data within the DMA Request Packet provide for sixteen levels of DRQs, but the system of FIG. 2 typically only has eight levels of DRQs, the most significant bit of the Packet ID field is always zero for a DMA Request Packet.

The timing of the serialization of an Interrupt Request is shown in FIG. 4. The second peripheral is selected for this specific example, and it is assumed that the second peripheral, which is coupled to EXCA controller 66, requires service from level seven IRQ when the second peripheral asserts the IRQ input of EXCA controller 66. The IRQ signal on input pin 94 is represented by waveform 142 in FIG. 4. The level seven IRQ signal within the system controller is represented by waveform 145 in FIG. 4. Common clock source 71 is represented by waveform 141.

When the second peripheral asserts the IRQ signal to EXCA controller 66, EXCA controller 66 outputs a serial packet on its serial out port that has a Packet Type of 60 (indicating an IRQ Request Packet) and a Packet ID of 0111 (indicating that level seven IRQ requires service). Note that EXCA controller 66 can only transmit this IRQ Request Packet when its serial in port is idle. The signal on the serial out port of EXCA controller 66 is represented by waveform 144. The signal on the serial in port of EXCA controller 66 is represented by waveform 143. EXCA controller 66 knows the serial in port is idle when this input shows a stop bit (is high) during one of the modulo 7 start times for EXCA controller 66. In FIG. 4, the serial in port of EXCA controller 66 is always high, so EXCA controller 66 can transmit the IRQ Request Packet immediately on the next packet, as soon as the modulo 7 start bit time occurs.

After this IRQ Request Packet travels through EXCA controllers 68 and 70, and through peripheral controller 62, it reaches system controller 60, which decodes the packet and asserts the level seven IRQ signal to its internal Interrupt controller.

An SMI Request Packet is handled in the exact same way as the Interrupt Request Packet just described, since an SMI is, in fact, a special type of interrupt. If FIG. 4 were modified so the IRQ label was replaced by an SMI label instead, this would accurately reflect the operation of the serial bus during an SMI Request Packet, as described above in relation to the IRQ Request Packet.

The operation of the data bus of FIG. 2 includes inherent latency in serializing and shifting the required data packets to system controller 60. This latency can increase when different EXCA controllers require use of the serial bus at the same time, as shown in FIG. 5. In this example, the second peripheral asserts the IRQ input on input pin 94 of EXCA controller 66, which corresponds to level seven IRQ. The IRQ signal on input pin 94 is represented by waveform 152 in FIG. 4. Common clock source 71 is represented by waveform 151. EXCA controller 66 would like to send an IRQ Request Packet on the next modulo 7 start bit, but during the next start bit the serial in port is active with a level five DRQ request from the first peripheral. The signal on the serial out port of EXCA controller 66 is represented by waveform 154. The signal on the serial in port of EXCA controller 66 is represented by waveform 153. An 11 in the Packet Type field identifies this packet as a DMA Request Packet, and 0601 in the Packet ID field identifies this DMA Request as a level five DRQ. EXCA controller 66 must therefore wait until its serial in port goes inactive by showing a stop bit. Once the stop bit is seen, EXCA controller 66 can output the Interrupt Request Packet on the very next packet, thereby minimizing latency.

The latency of the serial bus can impair system performance if it becomes too long. For this reason the IRQ and DRQ information is binary encoded in the Packet Type field and the Packet ID field to reduce the number of bits required to communicate all the needed IRQ and DRQ signals. The maximum latency for a single packet in the system of FIG. 2 occurs for EXCA controller 64, and is as follows:

seven clocks before the start bit location seven clocks to transmit the packet one clock latency for each of the three other EXCA controllers 66, 68, and 70 one clock latency for the peripheral controller 62.

This results in a total of 68 clock cycles of latency. At 25 MHz, the total latency is therefore 770 nanoseconds. If two packets occur simultaneously, the worst case latency is increased by seven additional clock cycles while the first packet is transmitted, resulting in a total latency of 25 clock cycles. At 25 MHz, the worst-case latency is therefore 1 microsecond. For each additional packet that occurs simultaneously, add an additional 250 nanoseconds of latency. Note that the prior art implementation of this type of serial bus found in the VL82C480 chipset had a packet wherein each IRQ and DRQ had a separate bit. The IBM PC-AT computer has fifteen different IRQ inputs, seven different DRQ inputs, and one SMI interrupt. So the prior art implementation of the VL82C480 chipset required a 26 bit serial bus packet since the data was not encoded. By encoding the data, this number is reduced from 24 bit packets to 7 bit packets, which greatly reduces the latency of the serial bus.

Figure 6:
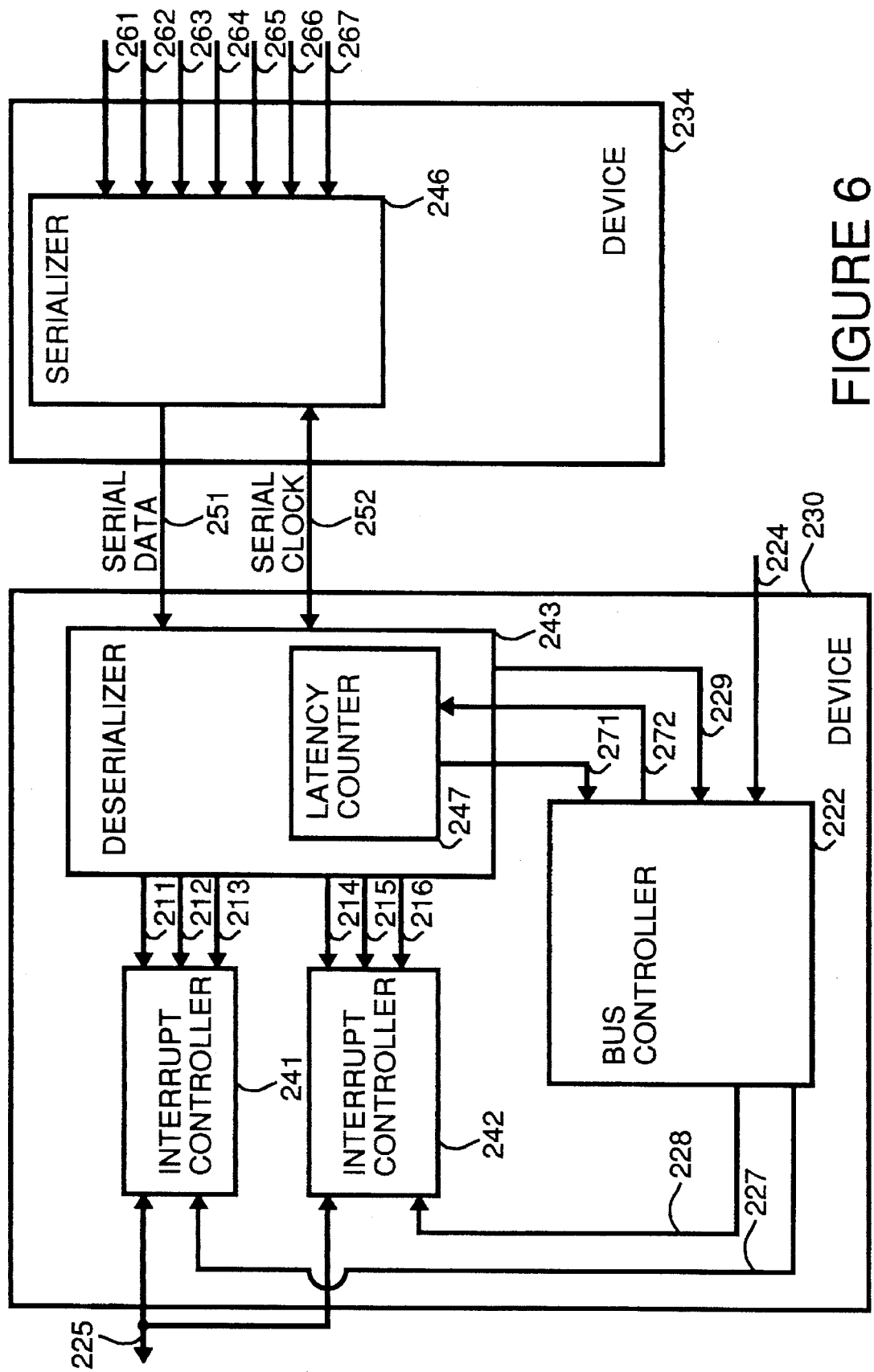
FIG. 6 shows a simplified block diagram of a system in which the rising and falling edges of signals on request pins are detected and serialized in accordance with an alternate preferred embodiment of the present invention.

FIG. 6 shows a simplified block diagram of a system in accordance with an alternate preferred embodiment of the present invention. In FIG. 6, a device 234 is connected to a device 230 through a serial bus consisting of a serial data line 251 and a serial clock line 252. For the embodiment in FIG. 6, a number of devices may all be connected to serial data line 251. This is in contrast to the embodiment shown in FIG. 1 where only two devices are connected to each serial bus connection.

Various IRQ request signals are placed on IRQ request lines 261, 262, 263, 264, 265, 266 and 267. The signals placed on IRQ request lines 261, 262, 263, 264, 265, 266 and 267 are encoded by a serializer 246. For each transition of the signal on any of IRQ request lines 261, 262, 263, 264, 265, 266 and 267, serializer 246 sends, in a packet, an indicator which indicates the current voltage value of the request line on which the transition occurred. Device 234 may have other request pins, the signals on which are encoded by serializer 246. The packet may be generated by device 234. Alternately, if there are other devices connected to serial data line 251, the packet may be generated by another device. Depending upon the implementation chosen, this indicator can be either edge information or the current value on the request line. The packet is sent through serial bus data line 251 to device 230.

For example, in one embodiment of the present invention, for every packet transmitted on a serial bus, each device connected to the serial bus indicates in a specific location in the packet the current value on each of the IRQ/DRQ request lines connected to the device.

Device 230 includes various controllers. For example, FIG. 6 shows device 230 to include an interrupt controller 241 and an interrupt controller 42. Deserializer 243 deserializes packet information received by device 230 over serial bus line 251. For example, packets indicating a transition of an interrupt request signals are received by deserializer 243. For each transition packet which indicates a transition on one of request lines 261, 262 or 263, deserializer 243 produces an emulated interrupt request signal and forwards the emulated interrupt request signal to interrupt controller 241 on one of lines 211, 212 or 213, respectively. For each transition packet which indicates a transition on one of request lines 264, 265 or 266, deserializer 243 produces an emulated interrupt request signal and forwards the emulated interrupt request signal to interrupt controller 242 on one of lines 214, 215 or 216, respectively.

A bus controller 222 is used by a host system to control a read of the IRQ signals received by interrupt controller 241 and IRQ signals received by interrupt controller 242 onto bus data lines 225 of an I/O bus. For example, in this alternate preferred embodiment, the data bus operates in accordance with the PCI bus standard and bus controller 222 is a PCI slave controller. Alternately, an I/O bus operating in accordance with another stand may be utilized.

Bus controller 222 controls a read from interrupt controller 241 using I/O read lines 227. Bus controller 222 controls a read from interrupt controller 242 using I/O read lines 228.

Bus controller 222 is directed by the host system to perform reads from interrupt controller 241 and interrupt controller 242 by control information placed on control lines 224 of the I/O bus. Bus controller 222 has two modes of operation. In a "demand" mode, whenever a device connected to serial data line 251 detects a value change on any of its DRQ/IRQ request lines, a DRQ/IRQ packet is initiated. Once a DRQ/IRQ packet is initiated, each device connected to serial data line 251 will indicate in the IRQ/DRQ packet a current state for all of its IRQ/DRQ request lines.

In "demand" mode, when directed by control information placed on control lines 224 to perform a read, bus controller 222 will check a busy signal on line 229 to determine whether deserializer 243 is busy. If deserializer 243 is not busy, bus controller 222 will perform the read. If the busy signal on line 229 is asserted, bus controller 222 will assert a latency counter start signal on a line 272 and issue a retry signal to the bus. Once a latency counter 247 within deserializer 243 receives the latency counter start signal on line 272, latency counter 247 will count to a latency count which is equal to a maximum member of clocks it could take for an IRQ state transition at a pin in device 234 (or other device on the serial bus) to result in a change in an output of deserializer 243. Bus controller 222 will continue to issue retry signals to the bus until either deserializer 243 de-asserts the busy signal on line 229 or until latency counter 247 has finished counting the latency count and asserted a latency counter done signal on a line 271, whichever first occurs. In the preferred embodiment, when deserializer 243 de-asserts the busy signal on line 229 before latency counter 247 has finished counting the latency count, latency counter 247 is stopped from counting and the value in latency counter 247 is cleared to zero.

Also, in the preferred embodiment, deserializer 243 will continue to assert the busy signal on line 229 for two clock cycles after it has received a package over the serial bus. Deserializer 243 will de-assert the busy signal on line 229 only when the two clock cycles have elapsed and deserializer 243 has not begun reception of a new packet from the serial bus.

Alternately, in demand mode the latency counter is ignored. That is, if the busy signal on line 229 is asserted, bus controller 222 will continue to issue retry signals to the bus until deserializer 243 de-asserts the busy signal on line 229.

In a "polled" mode, deserializer 243 will always be busy. This is because IRQ/DRQ packets will be continually sent over serial data line 251. Each device connected to serial data line will indicate in each IRQ/DRQ packet a current state for all of its IRQ/DRQ request lines.

Thus, in polled mode, when directed by control information placed on control lines 224 to perform a read, bus controller 222 will assert the latency counter start signal on a line 272 and issue a retry signal to the I/O bus. Once latency counter 247 within deserializer 243 receives the latency counter start signal on line 272, latency counter 247 will count the latency count. Bus controller 222 will continue to issue retry signals to the bus until latency counter 247 has finished counting the latency count and asserted the latency counter done signal on line 271.

The foregoing discussion discloses and describes merely exemplary methods and embodiments of the present invention. As will be understood by those familiar with the art, the invention may be embodied in other specific forms without departing from the spirit or essential characteristics thereof. For example, in the preferred embodiment of the present invention shown in FIG. 6, latency counter 247 is shown in deserializer 243. In alternate embodiments latency counter 247 could have been placed elsewhere in device 230, for example, in bus controller 222. Accordingly, the disclosure of the present invention is intended to be illustrative, but not limiting, of the scope of the invention, which is set forth in the following claims.

We claim:

1. A method for providing requested information to a host system comprising the steps of:
   (a) when a first peripheral device asserts a first request signal on a first request pin of a first I/O device, performing the following substeps,
      (a.1) indicating, by the first peripheral device, assertion of the first request signal in a first packet on a serial bus,
      (a.2) forwarding the first packet to a serial in port of a controller device, and
      (a.3) upon the serial in port receiving the first packet, asserting, by a deserializer within the request controller, an emulated first request signal, the emulated first request signal being coupled to a first request controller within the controller device; and,
   (b) when a host system requests the request controller to forward a value of the first request signal, performing the following substeps:
      (b.1) waiting for the deserializer to be idle, and
      (b.2) when the deserializer is idle, forwarding a value of the emulated first request signal from the request controller to the host system.

2. A method as in claim 1 wherein during performance of substep (a.3) the deserializer generates a busy signal.

3. A method as in claim 2 wherein in substep (b.1) wait state assertion logic monitors the busy signal generated by the deserializer to determine when the deserializer becomes idle.

4. A method as in claim 3 wherein in substep (b.1) when the wait state assertion logic determines the deserializer has become idle, the wait state assertion logic signals a bus controller that the deserializer is idle.

5. A method as in claim 1 wherein in substep (b.2) the value of the emulated first request signal is forwarded to the host system over an I/O bus which performs in accordance with an ISA bus standard.

6. A method as in claim 1 wherein in substep (b.2) the value of the emulated first request signal is forwarded to the host system over an I/O bus which performs in accordance with a PCI bus standard.

7. A method for providing requested information to a host system comprising the steps of:

(a) when a voltage transition occurs on any request pin of an I/O device, performing the following substeps,
 (a.1) forwarding, in a first packet over a serial bus to a controller device, an indicator indicating a current value for the request pin on which the voltage transition occurred, and
 (a.2) receiving, by a deserializer within the controller device, the first packet, and
 (a.3) outputting, by the deserializer, a signal which indicates the current value for the voltage on the indicated request pin;
(b) while the deserializer is not idle, asserting, by the deserializer, a busy signal; and,
(c) when the controller device receives a request from a host system for a current value on a first request pin of the I/O device, performing the following substeps,
 (c.1) if the busy signal is not asserted, forwarding to the host system a current value for a voltage on the indicated request pin as indicated by the deserializer, and
 (c.2) if the busy signal is asserted, performing the followings substeps,
  (c.2.1) starting a counter, the counter issuing a finished signal when the counter has counted a sufficient amount of clock cycles to allow any voltage transition occurring on any request pin of an I/O device to result in a signal being generated by the deserializer, and
  (c.2.2) upon the counter issuing the finished signal or upon the busy signal on longer being asserted, whichever first occurs, forwarding to the host system the current value for the voltage on the indicated request pin as indicated by the deserializer.

8. A method as in claim 7 wherein in step (c) the controller device operates in two modes, wherein in a first mode the deserializer periodically is in an idle state and in a second mode, the deserializer never enters the idle state.

9. A method as in claim 8 wherein when the controller device is operating in the second mode, in sub step (c.2.2), the current value for the voltage on the indicated request pin is forwarded to the host system upon the counter issuing the finished signal.

10. A method as in claim 7 wherein in step (c) the current value for the voltage on the indicated request pin is forwarded to the host system over an I/O bus which performs in accordance with a PCI bus standard.

11. A system comprising:
a serial bus;
an I/O device, coupled to the serial bus, including,
 at least one request pin, and
 indicating means for responding to a voltage transition occurring on a request pin of the I/O device by forwarding in a first packet over the serial bus an indicator, the indicator indicating a current value for a voltage on the request pin of the I/O device on which the voltage transition occurred; and
a controller device, coupled to the serial bus, including,
 a deserializer, the deserializer receiving the first packet and outputting a signal which indicates a current voltage value on the request pin on which the voltage transition occurred, the deserializer including a means for indicating when the deserializer is busy and when the deserializer is idle,
 a counter which, when started, issues a finished signal when the counter has counted a sufficient amount of clock cycles to allow any voltage transition occurring on any request pin of the I/O device to result in a signal being generated by the deserializer, and
 a bus controller, coupled to the deserializer and to the counter, the bus controller responding to a request from a host system for the current value on the first request pin of the I/O device, by forwarding to the host system a current value for a voltage on the indicated request pin as indicated by the deserializer when the deserializer is not busy, wherein when the deserializer is busy, the bus controller responds to the request from the host system for the current value on the first request pin of the I/O device, by starting the counter, and upon the counter issuing the finished signal or upon the deserializer becoming idle, whichever first occurs, forwarding to the host system the current value for the voltage on the indicated request pin as indicated by the deserializer.

12. A system as in claim 11, wherein the counter is within the deserializer.

13. A system as in claim 11, wherein the deserializer indicates the deserializer is busy by asserting a busy signal on a busy line.

14. A system as in claim 11, wherein the controller device operates in two modes, in a first mode, the deserializer periodically being in an idle state and in a second mode, the deserializer never entering the idle state.

15. A system as in claim 14, wherein when the controller device is operating in the second mode, the bus controller forwards the current value for the voltage on the indicated request pin to the host system upon the counter issuing the finished signal.

16. A system as in claim 11, wherein the system includes an I/O bus coupled to the controller device, the current value for the voltage on the indicated request pin being forwarded to the host system over the I/O bus, the I/O bus performing in accordance with a PCI bus standard.

17. A system comprising:
a serial bus;
an I/O device, coupled to the serial bus, including,
 at least one request pin, and
 indicating means for responding to a voltage transition occurring on a request pin of the I/O device by forwarding, in a first packet over the serial bus, an indicator which indicates a current value for a voltage on the request pin of the I/O device on which the voltage transition occurred; and
a controller device, coupled to the serial bus, including
 a deserializer, the deserializer receiving the first packet and outputting a signal which indicates the current value for the voltage for the request pin on which the voltage transition occurred, the deserializer including a means for indicating when the deserializer is busy and when the deserializer is idle, and a bus controller, coupled to the deserializer and to the counter, the bus controller responding to a request from a host system for a current value on a first request pin of the I/O device, by forwarding to the host system a current value for a voltage on the indicated request pin, as indicated by the deserializer, when the deserializer is not busy, wherein when the deserializer is busy, the bus controller responds to the request from the host system for the current value on the first request pin of the I/O device by waiting for the deserializer to become idle and upon the deserializer becoming idle, forwarding to the host system the current value for the voltage on the indicated request pin.

18. A system as in claim 17, wherein the system includes an I/O bus coupled to the controller device, the current value for the voltage on the indicated request pin being forwarded to the host system over the I/O bus, the I/O bus performing in accordance with an PCI bus standard.

19. A system as in claim 17, wherein the deserializer indicates the deserializer is busy by asserting a busy signal on a busy line.

20. A system as in claim 19, wherein the controller device includes wait state assertion logic, coupled to the busy line and to the bus controller, the wait assertion logic preventing the bus controller from forwarding to the host system the current value for the voltage on the indicated request pin when the deserializer when the deserializer is busy.

21. A system as in claim 17, wherein the system includes an I/O bus coupled to the controller device, the current value for the voltage on the indicated request pin being forwarded to the host system over the I/O bus, the I/O bus performing in accordance with an ISA bus standard.

* * * * *